US011308513B2

(12) United States Patent
Jogani

(10) Patent No.: US 11,308,513 B2
(45) Date of Patent: Apr. 19, 2022

(54) HABIT-BASED REWARDS SYSTEMS AND METHODS

(71) Applicant: Capital One Services, LLC, McLean, VA (US)

(72) Inventor: Viral Jogani, Moonachie, NJ (US)

( * ) Notice: Subject to any disclaimer, the term of this patent is extended or adjusted under 35 U.S.C. 154(b) by 0 days.

(21) Appl. No.: 16/681,266

(22) Filed: Nov. 12, 2019

(65) Prior Publication Data
US 2021/0142353 A1 May 13, 2021

(51) Int. Cl.
*G06Q 30/02* (2012.01)
*G06N 20/00* (2019.01)

(52) U.S. Cl.
CPC ......... *G06Q 30/0224* (2013.01); *G06N 20/00* (2019.01); *G06Q 30/0201* (2013.01); *G06Q 30/0213* (2013.01)

(58) Field of Classification Search
CPC ........... G06Q 30/0224; G06Q 30/0213; G06Q 30/0201; G06N 20/00
USPC ........... 705/14.15, 14.34, 4, 15, 14.13, 26.7, 705/14.12, 14.41, 7.33; 715/716
See application file for complete search history.

(56) References Cited

U.S. PATENT DOCUMENTS

| 9,875,614 B2 | 1/2018 | McCoy et al. | |
| 2003/0046163 A1* | 3/2003 | Carpenter, III | .... G06Q 30/0211 705/14.13 |
| 2005/0049920 A1* | 3/2005 | Day | ........................ G06Q 50/12 705/15 |
| 2008/0103910 A1 | 5/2008 | Gardenswartz | |
| 2009/0063971 A1* | 3/2009 | White | ..................... G11B 27/34 715/716 |
| 2010/0241501 A1* | 9/2010 | Marshall | ................. G06Q 30/00 705/14.13 |
| 2011/0270666 A1* | 11/2011 | Welsh | ................ G06Q 30/0234 705/14.34 |
| 2013/0041731 A1* | 2/2013 | Navar | .................. G06Q 20/027 705/14.12 |
| 2013/0226729 A1* | 8/2013 | Reed | .................. G06Q 30/0226 705/26.7 |
| 2013/0339144 A1* | 12/2013 | Kim | ................... G06Q 30/0255 705/14.53 |

(Continued)

FOREIGN PATENT DOCUMENTS

JP 2013105309 A * 5/2013 ......... G06F 16/9535

OTHER PUBLICATIONS

James Clear, Habit Formation & The Reward System & Change, 2019 (Year: 2019).*

*Primary Examiner* — Tarek Elchanti
(74) *Attorney, Agent, or Firm* — Sterne, Kessler, Goldstein & Fox P.L.L.C.

(57) ABSTRACT

The present disclosure is directed to systems and methods for determining one or more incentives for a user. For example, a method that may include: receiving a selection of an objective from among a plurality of objectives from a user via a client device; presenting, based on the selected objective, one or more incentives from among a plurality of incentives to the user, the plurality of incentives being based on a machine learning model trained to determine the plurality of incentives based on past purchases; receiving a selection of at least one of the one or more incentives from the user via the client device; and determining whether to allocate the selected one or more incentives based on a performance of the user.

16 Claims, 3 Drawing Sheets

(56) References Cited

U.S. PATENT DOCUMENTS

| | | | |
|---|---|---|---|
| 2014/0046747 A1* | 2/2014 | Aust | G06Q 10/06398 |
| | | | 705/14.34 |
| 2014/0244361 A1* | 8/2014 | Zhang | G06Q 30/0204 |
| | | | 705/7.33 |
| 2014/0358666 A1* | 12/2014 | Baghaie | G06Q 30/0267 |
| | | | 705/14.41 |
| 2015/0187016 A1* | 7/2015 | Adams | G06Q 40/08 |
| | | | 705/4 |
| 2018/0075420 A1 | 3/2018 | Barnett et al. | |
| 2019/0069154 A1* | 2/2019 | Booth | G06F 1/1635 |
| 2020/0364662 A1* | 11/2020 | Avery, Jr. | H04W 4/80 |

* cited by examiner

HABIT-BASED REWARDS SYSTEMS AND METHODS

BACKGROUND

Rewards programs for transaction cards, such as bonus points, cash back, travel miles, etc. may be earned in many ways. For example, a user may earn points per dollars spent on all purchases, and some companies may offer more points based on the category of the purchase. That is, some companies may reward certain categories of spending (e.g., restaurants, entertainment, etc.). In some programs, the categories that receive the extra points are pre-established by the card provider. However, these reward categories fail to consider the specific habits, interests, or goals of each individual user.

BRIEF SUMMARY

According to some aspects, an example embodiment is directed to a method that may include: receiving a selection of an objective from among a plurality of objectives from a user via a client device; presenting, based on the selected objective, one or more incentives from among a plurality of incentives to the user, the plurality of incentives being based on a machine learning model trained to determine the plurality of incentives based on past purchases; receiving a selection of at least one of the one or more incentives from the user via the client device; and determining whether to allocate the selected one or more incentives based on a performance of the user.

According to further aspects, an example embodiment is directed to a system that may include: a memory for storing instructions for determining one or more incentives for a user; and a processor, communicatively coupled to the memory, configured to execute the instructions, the instructions causing the processor to: receive a selection of an objective from among a plurality of objectives from a user via a client device; present, based on the selected objective, one or more incentives from among a plurality of incentives to the user, the plurality of incentives being based on a machine learning model trained to determine the plurality of incentives based on past purchases; receive a selection of at least one of the one or more incentives from the user via the client device; and determine whether to allocate the selected one or more incentives based on a performance of the user.

A further example embodiment is directed to a non-transitory, tangible computer-readable device having the above instructions stored thereon that, when executed by at least one computing device, causes the at least one computing device to perform operations described herein.

BRIEF DESCRIPTION OF THE DRAWINGS/FIGURES

The accompanying drawings are incorporated herein and form a part of the specification.

DETAILED DESCRIPTION

It is to be appreciated that the Detailed Description section, and not the Summary and Abstract sections, is intended to be used to interpret the claims. The Summary and Abstract sections may set forth one or more but not all example embodiments as contemplated by the inventor(s), and thus, are not intended to limit the appended claims in any way.

Figure 1:
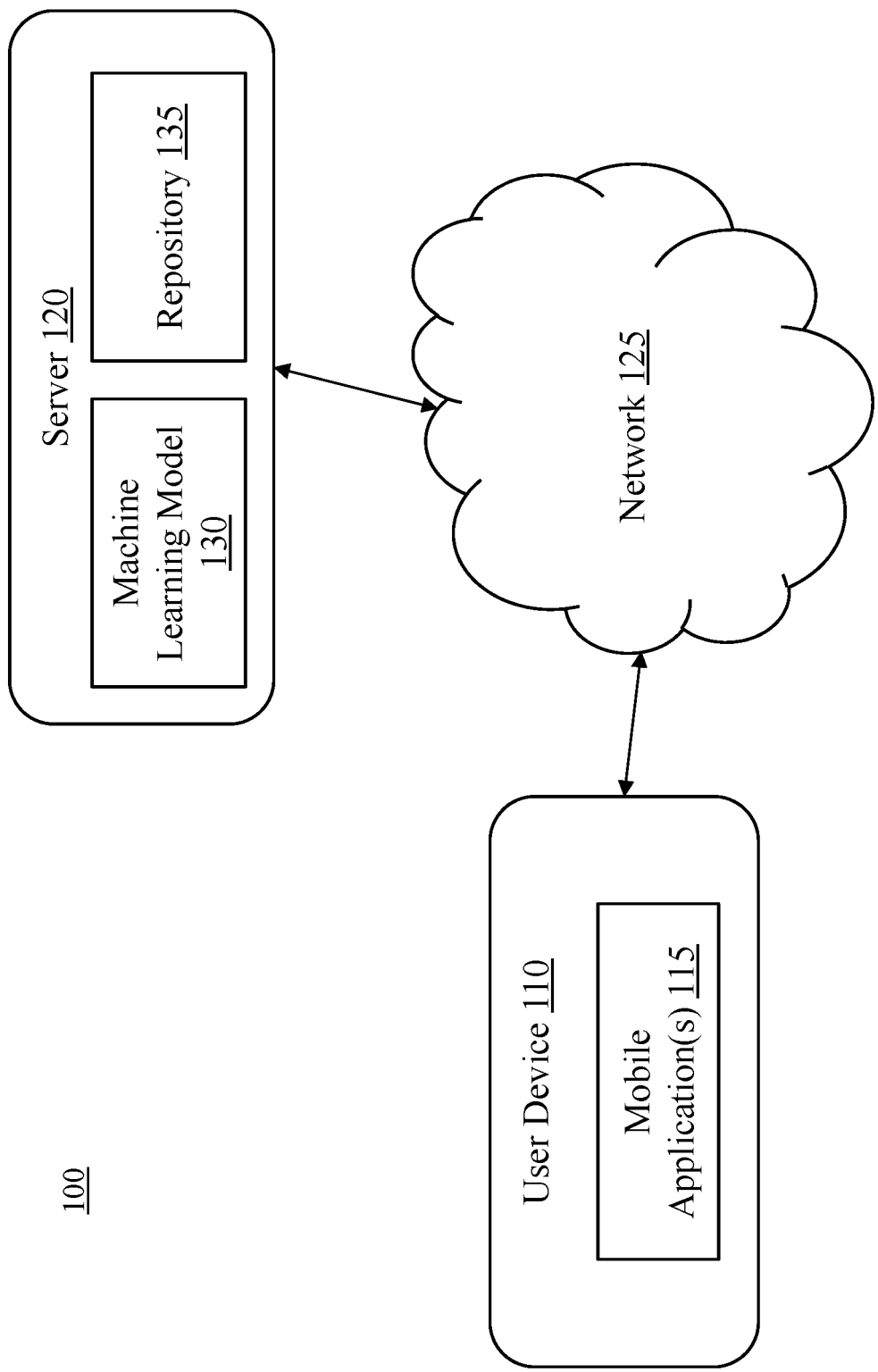
FIG. 1 is a block diagram of a system, according to some example embodiments.

FIG. 1 is a diagram of an example environment 100 in which example systems and/or methods may be implemented. As shown in FIG. 1, environment 100 may include a client device 110, a server 120, a network 125. Devices of the environment 100 may interconnect via wired connections, wireless connections, or a combination of wired and wireless connections. Devices of environment 100 may include a computer system 300 shown in FIG. 3, discussed in greater detail below.

In some embodiments, the client device 110 may be any device that may be used to access an account associated with an operator of the server 120. For example, the client 110 may be a device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. The client device 110 may include one or more mobile applications 115. For example, the one or more mobile applications 115 may include a mobile application associated with the operator of the server 120. In some embodiments, a user may access an account managed by the operator of the server 120 via the mobile application 115 of the client device 110. In further embodiments, the user may access the account managed by the operator of the server 120 by logging into the account via a website using the client device 110.

The server 120 may include a server device (e.g., a host server, a web server, an application server, etc.), a data center device, or a similar device, capable of communicating with the client device 110 via the network 125. In some embodiments, the server 120 may include a machine learning model 130 trained to determine one or more incentives for the user based on one or more objectives of the user and a repository 135 for storing one or more purchase histories associated with respective users.

The network 125 may include one or more wired and/or wireless networks. For example, the network 125 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

Figure 2:
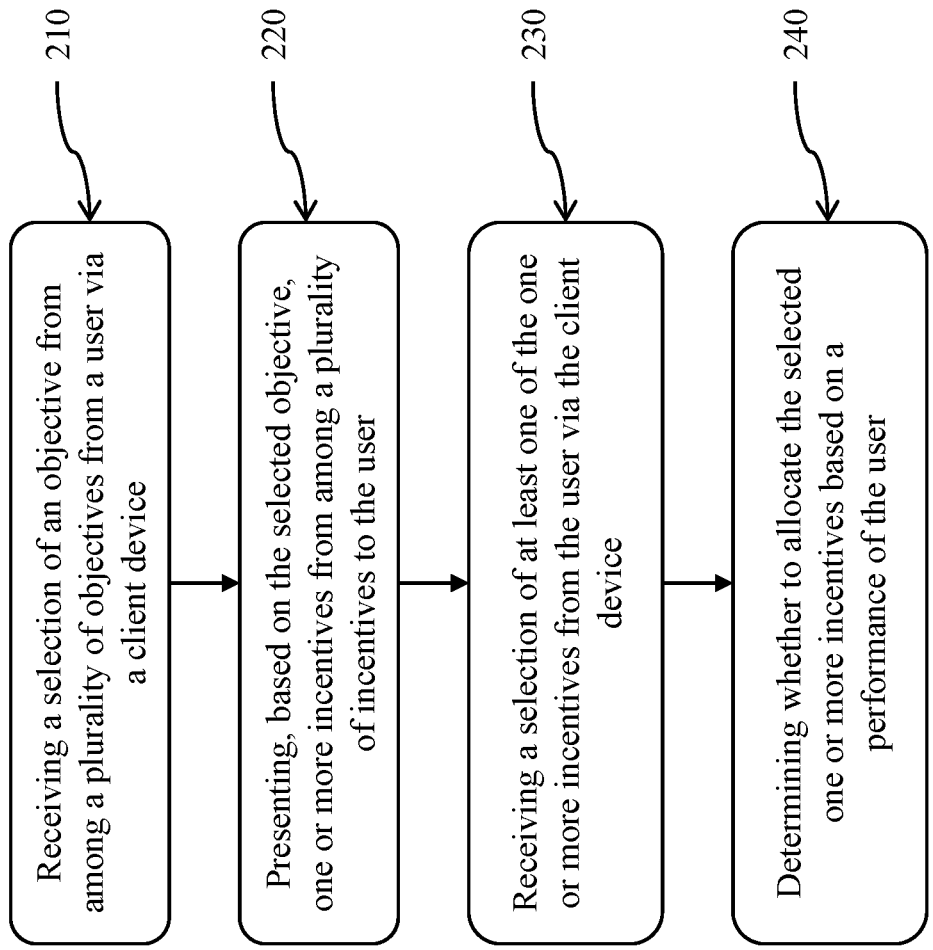
FIG. 2 is a flowchart illustrating a process for providing one or more incentives to a user based on an objective of the user, according to some example embodiments.

FIG. 2 is a flow chart of an example method 200 for presenting one or more incentives based on an objective received from a user. In some embodiments, one or more processes described with respect to FIG. 2 may be performed by a server device (e.g., the server 120 of FIG. 1). In some embodiments, at 210, the method 200 may include receiving a selection of an objective from among a plurality of objectives from a user via a client device (e.g., client device 110 of FIG. 1). For example, the user may access an account provided by an operator of the server 120 using the client device 110. In some embodiments, the user may access the account via an application operating on, for example, a mobile device, tablet, or the like, or the user may access the account via a website by providing, for example, a username and password. In some embodiments, the user may be required to register a new account associated with the operator of the server 120 after initially opening an account associated with a transaction card. Alternatively, the user may access a pre-existing account associated with the operator of the server 120.

After accessing the account, the user may select one or more objectives presented to the user. For example, the one or more objectives may include improving the user's health and fitness, increasing travel, reducing spending on a category (i.e., fast-food chains, restaurants, or the like), or attending more arts-based events (e.g., theatre event, concerts, museums, or the like). It should be understood by those of ordinary skill in the arts that there are merely example objectives, and that other objectives are further contemplated in accordance with aspects of the present disclosure. The one or more objectives may be predetermined objectives identified by the operator of the server 120. Alternatively, the one or more objectives may be determined based on votes received from other users having similar demographic information as the user. In further embodiments, the one or more objectives may be manually input by the user.

At 220, the method 200 may further include presenting, based on the selected objective, one or more incentives from among a plurality of incentives to the user. For example, the one or more incentives may be provided to the user via the mobile application 115 operating on the client device 110 or via user account on the website. In some embodiments, the server 120 may be configured to determine the one or more incentives based on a machine learning model (e.g., the machine learning model 130 of FIG. 1) trained to determine different incentives associated with respective categories of purchases related to the one or more objectives. In some embodiments, the machine learning model 130 may be trained using a supervised machine learning algorithm, an unsupervised machine learning algorithm, or a combination of both, to analyze one or more purchase histories to identify different categories of purchases. The one or more purchase histories may include a purchase history of the user and/or purchase histories of a plurality of users. For example, the machine learning model 130 may be trained using a density-based clustering technique such as, but not limited to, a K-means clustering algorithm or a support-vector clustering algorithm, to cluster the transactions of the purchase history of the user or the purchase histories of the plurality of users into the different categories of purchases.

Based on the clustered transactions, the machine learning model 130 may be trained to associate the categories of purchases with the one or more objectives. For example, the machine learning model 130 may be trained using an association algorithm, such as, but not limited to, an apriori algorithm, eclat algorithm, or a frequent-pattern growth (FP-growth) algorithm to determine a correlation between the different categories of purchases and the one or more objectives. As one example, the machine learning model 130 may be trained to associate purchases such as recreational or sports retailers, health food stores, facility memberships, or the like with the objective of improving health and fitness. As another example, the machine learning model 130 may be trained to associate purchases such as arts and crafts retailers, book retailers, or the like with increasing artistic hobbies.

In some embodiments, the machine learning model 130 may be further trained to determine a value for each of the one or more incentives. For example, the machine learning model 130 may be trained using a regression algorithm to determine the value for each the one or more incentives. Namely, in some embodiments, the machine learning model 130 may be trained using the purchase history of the user or the purchase histories of the plurality of users, such that the value of each incentive is inversely proportional to a popularity of the category of purchase. For example, if the user (or large number of the plurality of users, e.g., more than 75%) frequently makes purchases within a category, such as recreational or sports retailers, health food stores, facility memberships, or the like, the machine learning model 130 may be trained to determine a lower value for the incentive. Conversely, if the user (or a lower number of users of the plurality of users, e.g., less than 25%) makes fewer purchases in another category, e.g., artistic hobbies or the like, the machine learning model 130 may be trained to determine a greater value for the incentive. The machine learning model 130 may predict future rewards based on the incentives identified for the user and the purchase history of the user.

In some embodiments, the value of the incentive may be a percentage of an amount spent on purchases within the category (e.g., 1% to 5%) awarded as bonus points and/or cash back. In further embodiments, the incentive may be based on limiting a number of transactions or limiting an amount of money spent within a category, and by staying under the prescribed limit, the value of the incentive may be a lump sum of bonus points and/or cash back to the user. In still further embodiments, the limits for the number of transactions or the amount of money spent within the category may be selected by the user. For example, if the user sets an objective of improving health and fitness, the limits may include limiting a number of transaction at fast-food chains or the like to less than one (1) transaction per week or spending less than $50 per month on alcohol (e.g., at bars/pubs/clubs or at liquor retailers) in order to avoid undermining the user's objective. In another example, the limits may include limiting the number of transactions or amount spent in one category, while simultaneously spending a minimum amount in another category and/or at a participating retailer. As another example, the user may select to reduce the number of transactions or spending based on a percentage of existing spending habits. For example, the user may select to reduce (or increase) spending, by the number of transactions or the amount spent, in a given category by fifty (50) percent in an effort to achieve their objective. In further embodiments, the limits for the number of transactions or the amount of money spent within the category may be determined by the machine learning model 130. To achieve this, the machine learning model 130 may be trained to analyze the purchase history of the user or the purchase histories of the plurality of users using, for example, a regression algorithm.

In some embodiments, the machine learning model 130 may be further trained to associate demographic information of the plurality of users with the clustered categories of purchases. To achieve this, the machine learning model 130 may be trained using, for example, an association algorithm, such as, but not limited to, an apriori algorithm, eclat algorithm, or a frequent-pattern growth (FP-growth) algorithm to determine a correlation between the different categories of purchases and the demographic information of the plurality of users. The demographic information may include, but is not limited to, age, location, gender, education, profession, occupation, income level, home ownership status, vehicle ownership status, and/or marital status. In this way, the machine learning model 130 may be trained to identify categories of purchases that may be of interest to the user based on other users having similar demographic information.

For example, the machine learning model 130 may be trained using a collaborative filtering technique to identify categories of purchases that may be of interest to the user based on other users having similar demographic information. For example, for users that own vehicles, the one or more incentives may be offered for categories of purchases related to vehicles, e.g., vehicle maintenance, vehicle accessories, or the like, whereas for users without a vehicle, the one or more incentives may be offered for categories of purchases related to public transportation, vehicle rentals, ride-sharing services, or the like. Similarly, for users that own a residence, the one or more incentives may be offered for categories of purchases related to their residence, e.g., residence maintenance or the like, whereas a user renting their residence may not be offered such incentives. As yet another example, the one or more incentives may be based on a location of the user. For example, a user may be located in a rural region where outdoor activities, such as hiking, skiing, trekking, mountain biking, or the like, are common, and as such, the one or more incentives may be offered for categories of purchases associated with such activities. In contrast, another user may be located in a region where artistic activities, such as theatre events, concerts, museums, or the like, are more common, and as such, the one or more incentives may be offered for categories of purchases associated with such activities. Thus, determining the one or more incentives for the user may include analyzing demographic information of the user and identifying the one or more incentives based on other users from among the plurality of users having similar demographic information as the user.

In still further embodiments, the machine learning model 130 may be trained using a regression algorithm to predict future expenditures in each category based on the clustered purchase history (or purchase histories). Based on the clustered purchase history (or purchase histories) and the one or more objectives of the user, the machine learning model 130 may be trained to determine the value of the incentives for each category. Again, using health and fitness as an example, if the user indicated that improving their health was an objective, the machine learning model 130 may be trained to provide a greater value to an incentive for categories that are positively associated with the objective, e.g., recreational or sports retailers, health food stores, facility memberships, or the like, while simultaneously providing a lower value to an incentive (or no incentive at all) for categories that are negatively associated with the objective, e.g., fast-food chains, restaurants, bars/pubs/clubs, or the like. In this way, the user may be more encouraged to spend more money in categories that support the one or more objectives while being discouraged from spending more money in categories that undermine the one or more objectives.

The machine learning model 130 may also be trained to provide alternatives for reaching the user's objectives. For example, the machine learning model 130 may be trained to identify related categories of purchases, e.g., chiropractic care, acupuncture, massage therapy, etc., that further the user's objective, e.g., improving health and fitness. To achieve this, the machine learning model 130 may be trained using an association algorithm, such as, but not limited to, an apriori algorithm, eclat algorithm, or a frequent-pattern growth (FP-growth) algorithm to determine a correlation between the different categories of purchases that are related to the one or more objectives. For example, the machine learning model 130 may be trained to analyze the purchase histories of the plurality of users and determine that users that frequently conduct transactions at recreational or sports retailers, health food stores, facility memberships, or the like, also conduct transactions at related categories of purchases. Using this correlation, the machine learning model 130 may be trained to associate these related categories of purchases that also support the one or more objectives of the user.

The machine learning model 130 may also be trained to provide additional incentives for reaching the user's objectives. For example, the machine learning model 130 may be trained to identify and offer saving opportunities (i.e., coupons and/or discounts) at participating retailers that further the user's objective, e.g., improving health and fitness. To achieve this, the machine learning model 130 may be trained using an association algorithm, such as, but not limited to, an apriori algorithm, eclat algorithm, or a frequent-pattern growth (FP-growth) algorithm to determine a correlation between participating retailers that are related to the one or more objectives. Using this correlation, the machine learning model 130 may be trained to associate the participating retailers that support the one or more objectives of the user.

A time period for the one or more incentives may be effective on a rolling basis from a date of enrollment of the user. That is, the one or more incentives may be available for thirty (30) days, sixty (60) days, ninety (90) days, etc., from the date of enrollment, rather than a pre-established period of time (i.e., a different set of incentives being available each quarter, e.g., January-March, April-June, July-September, and October-December). In this way, the user may be able to maximize the opportunities to earn the incentives regardless of when the user selected the incentives. In further embodiments, the one or more incentives may be offered on a set schedule, e.g., on a quarterly basis.

At 230, the method 200 may include receiving a selection of at least one of the one or more incentives from the user via the client device. That is, the user may select which of the one or more incentives that the user wants to activate. For example, the user may select the one or more incentives via the mobile application 115 or via the website. At 240, the method 200 may also include determining whether to allocate the selected one or more incentives based on a performance of the user. For example, the server 120 may determine whether the user conducted transactions within the category associated with the selected, and if so, a reward amount to grant the user. Alternatively, or additionally, the server 120 may determine whether the user adhered to the limits set for a given category.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of the environment 100 may perform one or more functions described as being performed by another set of devices of the environment 100.

Figure 3:
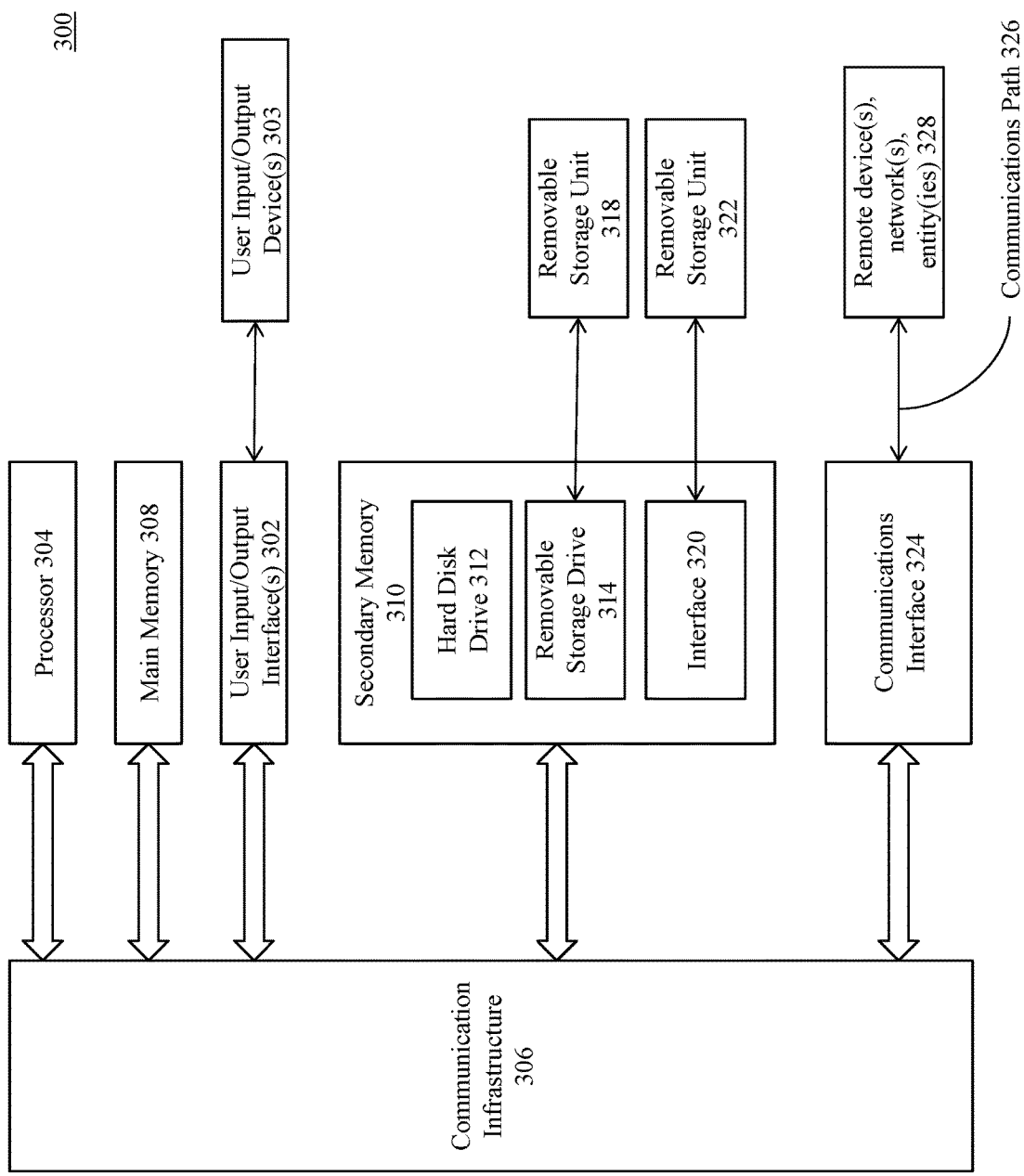
FIG. 3 is an example computer system useful for implementing various embodiments.

Various embodiments may be implemented, for example, using one or more well-known computer systems, such as computer system 300 shown in FIG. 3. One or more computer systems 300 may be used, for example, to implement any of the embodiments discussed herein, as well as combinations and sub-combinations thereof.

Computer system 300 may include one or more processors (also called central processing units, or CPUs), such as a processor 304. Processor 304 may be connected to a communication infrastructure or bus 306.

Computer system 300 may also include user input/output device(s) 303, such as monitors, keyboards, pointing devices, etc., which may communicate with communication infrastructure 306 through user input/output interface(s) 302.

One or more of processors 304 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 300 may also include a main or primary memory 308, such as random access memory (RAM). Main memory 308 may include one or more levels of cache. Main memory 308 may have stored therein control logic (i.e., computer software) and/or data.

Computer system 300 may also include one or more secondary storage devices or memory 310. Secondary memory 310 may include, for example, a hard disk drive 312 and/or a removable storage device or drive 314. Removable storage drive 314 may be a floppy disk drive, a magnetic tape drive, a compact disk drive, an optical storage device, tape backup device, and/or any other storage device/drive.

Removable storage drive 314 may interact with a removable storage unit 318. Removable storage unit 318 may include a computer usable or readable storage device having stored thereon computer software (control logic) and/or data. Removable storage unit 318 may be a floppy disk, magnetic tape, compact disk, DVD, optical storage disk, and/any other computer data storage device. Removable storage drive 314 may read from and/or write to removable storage unit 318.

Secondary memory 310 may include other means, devices, components, instrumentalities or other approaches for allowing computer programs and/or other instructions and/or data to be accessed by computer system 300. Such means, devices, components, instrumentalities or other approaches may include, for example, a removable storage unit 322 and an interface 320. Examples of the removable storage unit 322 and the interface 320 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 300 may further include a communication or network interface 324. Communication interface 324 may enable computer system 300 to communicate and interact with any combination of external devices, external networks, external entities, etc. (individually and collectively referenced by reference number 328). For example, communication interface 324 may allow computer system 300 to communicate with external or remote devices 328 over communications path 326, which may be wired and/or wireless (or a combination thereof), and which may include any combination of LANs, WANs, the Internet, etc. Control logic and/or data may be transmitted to and from computer system 300 via communication path 326.

Computer system 300 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 300 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 300 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 300, main memory 308, secondary memory 310, and removable storage units 318 and 322, as well as tangible articles of manufacture embodying any combination of the foregoing. Such control logic, when executed by one or more data processing devices (such as computer system 300), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 3. In particular, embodiments can operate with software, hardware, and/or operating system embodiments other than those described herein.

While this disclosure describes example embodiments for example fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

The foregoing description of the example embodiments will so fully reveal the general nature of the invention that others can, by applying knowledge within the skill of the art, readily modify and/or adapt for various applications such specific embodiments, without undue experimentation, without departing from the general concept of the disclosure. Therefore, such adaptations and modifications are intended to be within the meaning and range of equivalents based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described example embodiments, but should be defined only in accordance with the following claims and their equivalents.

What is claimed is:

1. A computer-implemented method comprising:

training a machine learning model using past purchases of a plurality of users stored on a repository as a training data set, wherein the machine learning model is trained, using the training data set including each of the past purchases of the plurality of users, to categorize, using a density-based clustering technique, the past purchases of the plurality of users into respective categories of purchases and to associate, using an association technique, the respective categories of purchases with a plurality of objectives, the plurality of objectives being based on votes received from other users having similar demographic information to a user;

receiving a selection of an objective from among the plurality of objectives from the user via an application of a client device;

identifying, using the machine learning model, one or more incentives from among a plurality of incentives based on the selected objective and similarities between demographic information of the user and demographic information of other users from among the plurality of users;

determining, using a regression algorithm of the machine learning model, a value for each of the one or more incentives based on the past purchases of the plurality of users using the density-based clustering technique;

presenting the identified one or more incentives from among the plurality of incentives to the user, wherein the presented one or more incentives have a determined value that is inversely proportional to a popularity of the respective category based on purchase histories of the plurality of users;

receiving a selection of at least one of the one or more incentives from the user via the application of the client device; and determining whether to allocate the selected one or more incentives based on a performance of the user.

2. The computer-implemented method of claim 1, wherein the machine learning model is trained to determine the plurality of incentives based on the respective categories of purchases.

3. The computer-implemented method of claim 1, wherein the presented one or more incentives comprise a bonus for limiting a number of transactions within a category of purchases from among the respective categories of purchases or a bonus for limiting a total amount of purchases within the category of from among the respective categories of purchases below a threshold amount.

4. The computer-implemented method of claim 1, wherein the one or more incentives comprises a bonus based on a total value of purchases within a category of purchases from among the respective categories of purchases.

5. A system, comprising:

a memory for storing instructions for determining one or more incentives for a user; and a processor, communicatively coupled to the memory, configured to execute the instructions, the instructions causing the processor to:

train a machine learning model using past purchases of a plurality of users stored on a repository as a training data set, wherein the machine learning model is trained, using the training data set including each of the past purchases of the plurality of users, to categorize, using a density-based clustering technique, the past purchases of the plurality of users into respective categories of purchases and to associate, using an association technique, the respective categories of purchases with a plurality of objectives, the plurality of objectives being based on votes received from other users having similar demographic information to s the user;

receive a selection of an objective from among the plurality of objectives from the user via an application of a client device;

identify, using the machine learning model, one or more incentives from among a plurality of incentives based on the selected objective and similarities between demographic information of the user and demographic information of other users from among the plurality of users;

determine, using a regression algorithm of the machine learning model, a value for each of the one or more incentives being trained to determine the plurality of incentives based on the past purchases of the plurality of users using the density-based clustering technique;

present the identified one or more incentives from among the plurality of incentives to the user, wherein the presented one or more incentives have a determined value that is inversely proportional to a popularity of the respective category based on purchase histories of the plurality of users;

receive a selection of at least one of the one or more incentives from the user via the application of the client device; and determine whether to allocate the selected one or more incentives based on a performance of the user.

6. The system of claim 5, wherein the machine learning model is trained to determine the plurality of incentives based on the respective categories of purchases.

7. The system of claim 5, wherein the presented one or more incentives comprises a bonus for limiting a number of transactions within a category of purchases from among the respective categories of purchases or a bonus for limiting a total amount of purchases within the category of purchases from among the respective categories of purchases below a threshold amount.

8. The system of claim 5, wherein the one or more incentives comprises a bonus based on a total value of purchases within a category of purchases from among the respective categories of purchases.

9. A non-transitory, tangible computer-readable device having instructions stored thereon that, when executed by at least one computing device, cause the at least one computing device to perform operations comprising:

training a machine learning model using past purchases of a plurality of users stored on a repository as a training data set, wherein the machine learning model is trained, using the training data set including each of the past purchases of the plurality of users, to categorize, using a density-based clustering technique, the past purchases of the plurality of users into respective categories of purchases and to associate, using an association technique, the respective categories of purchases with a plurality of objectives, the plurality of objectives being based on votes received from other users having similar demographic information to a user;

receiving a selection of an objective from among the plurality of objectives from the user via an application of a client device;

identifying, using the machine learning model, one or more incentives from among a plurality of incentives based on the selected objective and similarities between demographic information of the user and demographic information of other users from among the plurality of users;

determining, using a regression algorithm of the machine learning model, a value for each of the one or more incentives being trained to determine the plurality of incentives based on the past purchases of the plurality of users using the density-based clustering technique;

presenting the identified one or more incentives from among the plurality of incentives to the user, wherein the presented one or more incentives have a value that is inversely proportional to a popularity of the respective category based on purchase histories of the plurality of users;

receiving a selection of at least one of the one or more incentives from the user via the application of the client device; and determining whether to allocate the selected one or more incentives based on a performance of the user.

10. The non-transitory, tangible computer-readable device of claim 9, wherein the machine learning model is trained to determine the plurality of incentives based on the respective categories of purchases.

11. The non-transitory, tangible computer-readable device of claim 9, wherein the presented one or more incentives comprises:
a bonus for limiting a number of transactions within a category of purchases from among the respective categories of purchases;
a bonus for limiting a total amount of purchases within the category of purchases from among the respective categories of purchases below a threshold amount; or
a bonus based on a total value of purchases within the category of purchases from among the respective categories of purchases.

12. The computer-implemented method of claim 1, wherein the density-based clustering technique comprises a K-means clustering algorithm or a support-vector clustering algorithm.

13. The system of claim 5, wherein the density-based clustering technique comprises a K-means clustering algorithm or a support-vector clustering algorithm.

14. The non-transitory, tangible computer-readable device of claim 9, wherein the density-based clustering technique comprises a K-means clustering algorithm or a support-vector clustering algorithm.

15. The computer-implemented method of claim 1, wherein the identifying further comprises:
determining a correlation between the respective categories of purchases and the demographic information of the plurality of users.

16. The computer-implemented method of claim 1, wherein the demographic information includes at least one of an age, a location, a gender, an education, a profession, an occupation, an income level, a home ownership status, a vehicle ownership status, or a marital status associated with the plurality of users.

* * * * *